Figure 1:
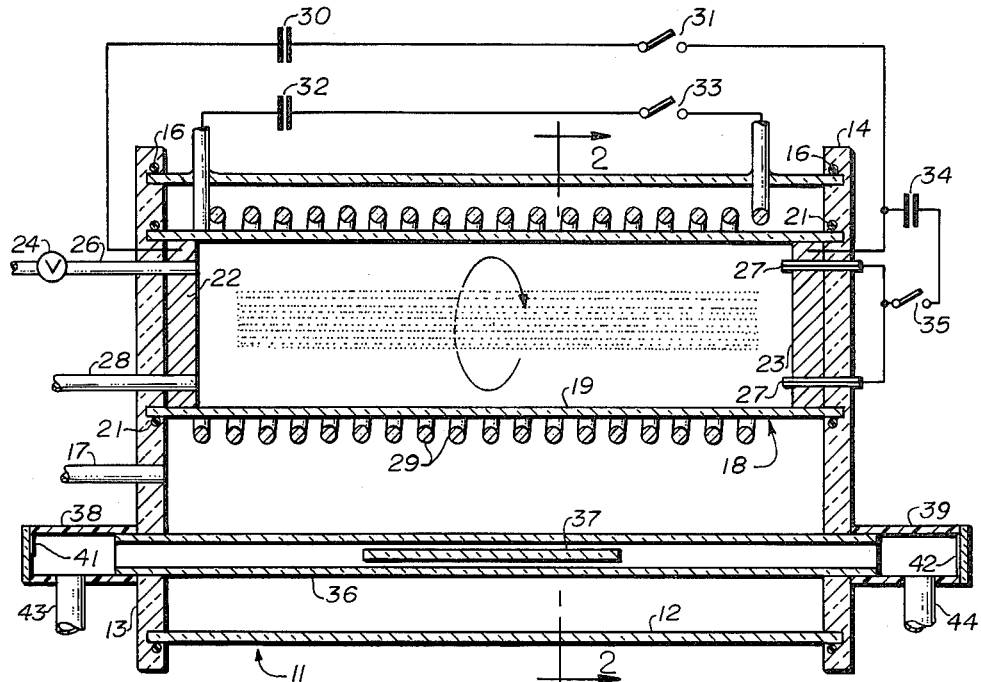

Sept. 28, 1965  S. A. COLGATE ETAL  3,209,281

METHOD AND APPARATUS FOR DYNAMIC PINCH PULSE MASER PUMPING

Filed March 22, 1962

INVENTORS
STIRLING A. COLGATE
BY ALVIN W. TRIVELPIECE

ATTORNEY

United States Patent Office 3,209,281
Patented Sept. 28, 1965

3,209,281
METHOD AND APPARATUS FOR DYNAMIC PINCH PULSE MASER PUMPING
Stirling A. Colgate, Livermore, and Alvin W. Trivelpiece, Lafayette, Calif., assignors to the United States of America as represented by the United States Atomic Energy Commission
Filed Mar. 22, 1962, Ser. No. 181,830
6 Claims. (Cl. 331—94.5)

The present invention relates generally to maser pumping and, more particularly, to a pulse maser pumping method and apparatus employing line radiation from a high temperature plasma.

A maser is a suitably prepared or excited sample of bulk matter which coherently amplifies an incident electromagnetic field. As is known in the art, maser amplification of radiation is, simply stated, dependent upon an ability to provide a greater number of microscopic systems (molecular or atomic) in a higher energy state than in some lower one. The difference between these energy states must correspond to the frequency of the radiation to be amplified.

One method of accomplishing this population inversion is to "pump" the maser with a highly intense radiaton field. That is, placing an unexcited maser device in a radiation field having a frequency corresponding to an energy difference between the above-mentioned higher state and any lower state will raise the $\mu$-system from the lower state to the higher state. The maser is now in a condition to amplify radiation having an appropriate frequency. For a detailed discussion of master operation, refer to Elements of Maser Theory by Arthur A. Vuylsteke, D. Van Nostrand Company, Inc., 1960.

The amount of amplification is, of course, directly dependent upon how many more $\mu$-systems are in the higher of the two states defining the energy gap corresponding to the frequency to be amplified. In addition, the spontaneous decay of the systems from the higher state is relatively great and rapid, especially in the higher frequency ranges. Hence, the pumping radiation must be very intense.

Masers are now being considered for the oscillation and amplification of frequencies in the infrared, optical, and even ultraviolet ranges. Maser oscillators or amplifiers in these ranges, or lasers as they are more commonly called, provide coherent amplification. In addition, masers provide a more monochromatic amplification in these frequency ranges than is possible with other amplifiers, and thus are highly sensitive. Thus, masers able to amplify these frequencies are very useful.

However, the required intensity of the pumping radiation is directly dependent on the frequency to be amplified. Until now, maser operation in the high frequencies has been seriously limited by the lack of a satisfactory method of supplying a highly intense, coherent, high frequency pumping field.

The present invention is a maser pumping method and apparatus which supplies this needed radiation. Generally, the invention comprises subjecting a maser device to line radiation emanating from a high temperature plasma. Line radiation as used here refers to the emission of line spectra by excitation and subsequent radiative transitions of electrons bound to nuclei. As is well known in the plasma art, the degree of ionization of the particles in a plasma is dependent upon the atomic number of the particles and the temperature to which they are raised, i.e., the amount of energy imparted to them. If partially ionized particles are present in a plasma, inelastic collisions of these particles with other plasma particles during thermalization results in excitation of these particles and subsequent line radiation. A more complete and mathematical treatment of this phenomenon including the plasma temperatures needed to ionize particles as a function of atomic number may be found by referring to the lecture "Impurity Radiation Losses From a High Temperature Plasma," Riso Report No. 18, pp. 313–346, given by R. F. Post at the International Summer Course in Plasma Physics held at Riso, Denmark, August 1–12, 1960. The preferred method of producing plasma line radiation for maser pumping is to "seed" a plasma formed from low atomic number particles, e.g., deuterium, with a small percentage of particles having a higher atomic number. Thus, by a proper choice of higher atomic number particles and their percentage in the plasma, it is possible to tailor the line radiation in intensity, spectrum, and duration.

It is therefore an object of the present invention to provide a method and apparatus for pumping masers utilizing pulse radiation fields in the optical and ultraviolet frequency range produced from a high temperature plasma.

Another object of the present invention is to provide a method in which a maser is pumped with fields produced at select frequencies and at intensity levels heretofore unattainable.

A further object of the present invention is to provide a maser pumping method and apparatus in which the radiation field employed for pumping said maser is produced at select frequencies and a wide range of intensity levels from a high temperature plasma.

A still further object of the invention is to provide a method and apparatus for pumping a maser with pulse radiation having a rise time in the fractional microsecond time range.

Figure 2:
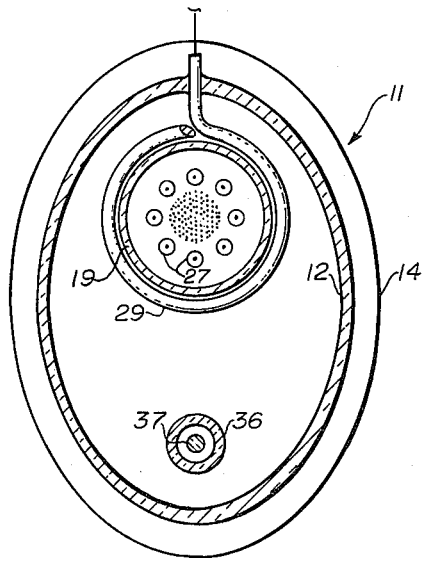

Other objects and advantages of the present invention will be apparent to those skilled in the art upon a consideration of the following description with reference to the attached drawings in which:

FIGURE 1 is a cross-sectional elevation view of a preferred embodiment of the inveniton used with an optical maser oscillator; and FIGURE 2 is a cross-sectional side view of the preferred embodiment of the invention.

Referring now to both FIGURES 1 and 2, there is shown a cylindrical vessel 11 having, as can be seen most clearly in FIGURE 2, an elliptical cross section. The wall 12 and end plates 13 and 14 of the vessel 11 are of a highly reflective material, e.g., silver, or may be of glass with an outside reflective coating of silver or manganese oxide. The end plates 13 and 14 are hermetically sealed to wall 12 by means of O rings 16. A pipe 17 permits the introduction of an inert gas into the vessel 11.

As shown in FIGURE 1, a dynamic pinch machine 18 is situated within the vessel 11 with its axis coinciding with one of the vessel's focal lines. This pinch machine 18 includes a quartz pinch tube 19 hermetically sealed by O rings 21 to the end plates 13 and 14. Electrodes 22 and 23 are provided, one in each end of tube 19. If end plates 13 and 14 are of silver, insulation must be placed between them and the electrodes. An inlet pipe 26 and valve 24 permits the introduction of a plasma gas and the higher atomic number particles into the pinch tube 19. A ring of pinch triggers 27 protrude through electrode 23 slightly into the tube 19. To permit vacuum pumping of the pinch tube, an outlet 28 communicates with the volume within the quartz tube 19. An axial field coil 29 is shown with a few turns around the pinch tube and connected to a capacitor bank 32 and firing switch 33.

A main capacitor bank 30 and switch 31 are connected across the electrodes 22 and 23. A trigger capacitor bank 34 and discharge switch 35 are provided connecting electrode 23 and the triggers 27.

With its axis coinciding with the other focal line of the vessel 11, there is a quartz tube 36 which protrudes through end plates 13 and 14. A solid state optical maser oscillator 37 is positioned coaxially within this tube 34 as shown in FIGURE 1. Caps 38 and 39, each having silvered ends 41 and 42, respectively, close the ends of the tube 36. The end 41 is only partially silvered in order that the radiation from the maser may leave the apparatus. A coolant inlet 43 and outlet 44 are provided in the caps 38 and 39, respectively.

In the operation of this preferred embodiment of the invention, the maser oscillator 37 is first conventionally cooled by passing a coolant, e.g., liquid nitrogen, through tube 36. This cooling removes energy from the device and leaves the unpaired electrons in low energy levels. At the same time the oscillator is being cooled, the pinch tube 19 is evacuated and then filled to approximately 100 microns of Hg with a plasma gas, e.g., deuterium, containing about 1% of an element having a higher atomic number, e.g., beryllium, boron, or carbon. An inert gas, e.g., helium, that will not absorb the pumping radiation is introduced through pipe 17 into vessel 11.

The switch 33 is fired and current flowing in coil 29 causes an axial magnetic field in the pinch tube 19. Immediately thereafter, the switch 31 is closed and switch 35 is discharged, firing the pinch triggers 27. This causes a tube-shaped axial current to flow in the plasma between the electrodes. As can be seen from the Post lecture, mentioned supra, by the proper choice of capacitor energy, i.e., plasma temperature, the deuterium gas will be ionized and the higher atomic number particles will only be partially ionized. This current also causes a circumferential magnetic field outside the plasma. The axial magnetic field is chosen to be less than the circumferential field and consequently there is a net inward pressure on the plasma. This inward pressure causes the plasma column to collapse toward the axis driving a shock wave ahead of it. By properly choosing the strength of the axial magnetic field, the final pinch diameter and plasma density may be controlled, thus allowing prolongation of the light emission at lower intensity.

When the plasma reaches its minimum radius, the inward directed velocity is converted to random motion in about the transit time of sound across the shock thickness. Thus, the energy gained from the capacitor bank will be converted to thermal energy, and the partially ionized particles will become excited. Line radiation from these particles will emanate in all directions from the plasma. However, the plasma is concentrated about a focal line of the elliptical vessel 11 and the radiation, upon striking wall 12, will be reflected to the other focal line, and hence most of it will be incident on the oscillator 36. Because of its great intensity, this pulse of monochromatic energy will greatly excite the oscillator. As per conventional maser operation, the usual maser oscillation will then take place with the radiation being reflected back and forth through the oscillator before it emanates from the end of cap 38.

As stated before, the choice of which higher atomic number particles to use is dependent on the frequency, intensity, and duration desired in the pumping radiation. The frequency of the line radiation must correspond to the pumping energy gap in the maser. The intensity and duration of the line radiation needed for pumping is determined partially by the decay time from the excited state and partially by the amount of amplification desired.

For pumping at the higher frequencies, it has been found that higher atomic number particles stripped down to a three electron or lithium like configuration produces the best results. Much less energy is needed to excite this type of configuration than is required to strip another electron from it. Examples of suitable three electron ions are Be II, B III, and C IV. Fairly low atomic number particles are preferred because of the fewer electrons that must be stripped to reach this configuration.

In one use of this invention, an initial density of deuterium gas of about $1 \times 10^{16}$ particles with about 1% concentration of carbon particles was injected into a plasma machine 10 cm. long and 10 cm. in diameter. The main capacitor bank had 2400 joules stored energy at 20 kilovolts.

The axial coil was not activated, and, hence, upon the firing of the bank capacitor across the electrodes, the plasma was reduced to about 1 cm. radius with the resulting particle density being about $10^{18}$ per cc. The plasma temperature was approximately 50 ev. and thus the carbon particles were ionized down to a three electron configuration. Thermalization occurred in $3 \times 10^{-7}$ seconds. The line radiation intensity from this plasma was about $10^8$ watts/cm.$^2$. Thus, the plasma gave up its total energy which was reflected to the maser in a little less than a microsecond.

The intensity of the pumping radiation given by this invention can be compared with the xenon flash lamp, the best pumping means to date, by noting that the xenon lamp gives up 2000 joules in about a millisecond, while in the above example, the dynamic pinch gave up its energy of 2000 joules in less than a microsecond. This represents about three orders of magnitude greater intensity.

This invention has been described with respect to a preferred embodiment. It will be apparent to those skilled in the art that any plasma machine capable of producing partial ionization and high temperature thermalization will be suitable for use in this invention. The invention may also be used to overpump low frequency masers, both solid state and gaseous. Many other combinations of partially ionized plasma particles and maser devices will also be apparent. Therefore, the scope of the invention is only intended to be limited by the following claims.

What is claimed is:

1. In a method for producing coherent radiation from a maser the steps comprising,
    (a) introducing gas particles into an evacuated region, said gas including particles of an atomic number greater than 1 thereby being capable of being partially ionized to leave residual electrons bound to the nuclei of said gas particles,
    (b) ionizing said gas particles to produce a plasma in said evacuated region,
    (c) applying a magnetic field to confine said plasma in a zone removed from contact with material walls defining said evacuated chamber,
    (d) heating said ionized gas particles to a temperature at which said particles of atomic number greater than 1 are ionized to a level at which residual electrons are bound to the nuclei thereof and excited to emit monochromatic principal line spectra radiation, and
    (e) subjecting a maser material to such radiation, said maser material having a pumping energy gap level less than the energy of said principal line spectra radiation to pump said maser to produce coherent radiation which is emitted therefrom.

2. In a method for producing coherent radiation from a maser the steps comprising,
    (a) introducing gas particles of a first elemental species into an evacuated region,
    (b) introducing gas particles of a second elemental species and of higher atomic number than said first elemental species into said evacuated region thereby establishing a gas mixture therein,
    (c) heating said gas mixture to a kinetic temperature to produce total ionization of said first element particles and partial ionization of said second element particles with excitation of the residual electron of said second element particles in the presence of a magnetic field within said evacuated region to produce a high temperature plasma confined away from material walls defining said space emitting intense line radition, and
(d) focusing the line radiation emitted by said high temperature plasma to impinge upon a maser material, said maser material having a pumping energy gap less than the energy of said principal line radiation to pump said maser to produce coherent radiation which is emitted therefrom.

3. The method of pumping a maser according to claim 2 further defined by said second element particles selected from those elements having an atomic number greater than three, and said gas mixture being heated to a kinetic temperature productive of partial ionization of said second element particles to the three electron configuration and with excitation of the residual electrons of said second element particles.

4. The method as recited in claim 3 wherein said gas mixture comprises,
(a) 99% deuterium first element particles, and
(b) 1% of second element particles selected from the group of elements consisting of beryllium, boron and carbon.

5. In a method for producing coherent radiation from a maser, the steps comprising,
(a) introducing a mixture of gas particles into a closed cylindrical dynamic pinch plasma tube, said gas including particles of a first and second elemental species, said second element particles having an atomic number higher than said first element particles,
(b) energizing a coil axially surrounding said pinch tube to establish an axial magnetic field within said pinch tube,
(c) passing a high level electrical current axially through said gas to ionize and heat said gas mixture to effect total ionization of said first element particles and partial ionization and accompanying excitation the residual electrons of said second element particles to emit principal line radiation at a frequency in the optical and ultraviolet frequency range, and
(d) focusing the principal line radiation emitted by said high temperature plasma to impinge upon a maser, material of which the pumping energy gap is less than the energy of the emitted principal line radiation to pump said maser and produce coherent line radiation which is emitted therefrom.

6. The method as recited in claim 5 further defined by,
(a) said gas mixture being of an initial particle density of the order of $10^{16}$ particles/cc. and including 99% deuterium particles and 1% carbon particles, and
(b) said current having an energy level of 2400 joules at an impressed voltage of 20 kilovolts, said current heating said gas mixture to a kinetic temperature of 50 electron volts whereby said carbon particles are partially ionized to and excited at the three electron configuration to emit principal line radiation in the ultraviolet frequency range.

References Cited by the Examiner

"Advances in Quantum Electronics," edited by Singer, Columbia University Press (New York), 1961, pages 288–292 (article by Colgate et al.).

ROY LAKE, *Primary Examiner.*

GEORGE N. WESTBY, *Examiner.*